(12) United States Patent
Dry et al.

(10) Patent No.: US 10,821,856 B2
(45) Date of Patent: Nov. 3, 2020

(54) VEHICLE CABIN

(71) Applicant: Ford Global Technologies, LLC, Dearborn, MI (US)

(72) Inventors: Alan George Dry, Grosse Pointe Woods, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/218,681

(22) Filed: Dec. 13, 2018

(65) Prior Publication Data

US 2020/0189423 A1 Jun. 18, 2020

(51) Int. Cl.

| *F16M 11/00* | (2006.01) |
|---|---|
| *B60N 2/075* | (2006.01) |
| *B60R 16/037* | (2006.01) |
| *B60N 2/01* | (2006.01) |
| *B60N 2/02* | (2006.01) |
| *B60R 16/03* | (2006.01) |

(52) U.S. Cl.
CPC ............ *B60N 2/075* (2013.01); *B60N 2/01* (2013.01); *B60N 2/0244* (2013.01); *B60R 16/03* (2013.01); *B60R 16/037* (2013.01); *B60N 2002/0264* (2013.01)

(58) Field of Classification Search
CPC ..... B60N 2/0292; B60N 2/01; B60N 2/01508
See application file for complete search history.

(56) References Cited

U.S. PATENT DOCUMENTS

| 5,606,903 | A | 3/1997 | Drittel | |
|---|---|---|---|---|
| 5,939,670 | A * | 8/1999 | Shteynberg | H02G 3/0487 174/481 |
| 7,677,629 | B2 * | 3/2010 | Akiya | B60N 2/01 296/64 |
| 2008/0034696 | A1 * | 2/2008 | Neuhofer | E04F 19/065 52/466 |
| 2019/0126780 | A1 * | 5/2019 | Dry | B60N 2/005 |
| 2019/0263295 | A1 * | 8/2019 | Dry | B60N 2/062 |
| 2019/0308736 | A1 * | 10/2019 | Gross | B64D 11/0639 |

FOREIGN PATENT DOCUMENTS

DE 102016207030 A1 10/2017

* cited by examiner

*Primary Examiner* — Amy J. Sterling
(74) *Attorney, Agent, or Firm* — David Coppiellie; Price Heneveld LLP

(57) ABSTRACT

A vehicle includes a track that defines a guide channel and a bridge that extends over the guide channel when the bridge is in a closed position. The bridge includes a first portion that is releasably coupled to a second portion. The first portion is pivotably engaged with a first side of the track.

20 Claims, 8 Drawing Sheets

VEHICLE CABIN

FIELD OF THE DISCLOSURE

The present disclosure generally relates to vehicles. More specifically, the present disclosure relates to vehicle interiors or cabins.

BACKGROUND OF THE INVENTION

Vehicles are often provided with seating assemblies that can be adjusted to some degree in a fore and aft direction. However, such arrangements can limit the number of configurations that are possible in a vehicle cabin. Accordingly, additional solutions are needed that provide greater configurability.

SUMMARY OF THE INVENTION

According to a first aspect of the present disclosure, a vehicle includes a track that defines a guide channel and a bridge that extends over the guide channel when the bridge is in a closed position. The bridge includes a first portion that is releasably coupled to a second portion. The first portion is pivotably engaged with a first side of the track.

Embodiments of the first aspect of the present disclosure can include any one or a combination of the following features:
  the first portion includes a tab-receiving portion positioned at a free end of the first portion;
  the second portion is positioned on a second side of the track and has a tab that is received within the tab-receiving portion of the first portion;
  the first portion further includes one or more protrusions that extend toward the track when the bridge is in the closed position and resist loads applied to a top of the bridge;
  the one or more protrusions includes a first protrusion positioned proximate the first side of the track and a second protrusion positioned proximate the second side of the track;
  the first protrusion engages with an upper surface of the track on the first side when the bridge is in the closed position;
  the second protrusion engages with an upper surface of the second portion when the bridge is in the closed position such that the second portion is positioned between the second protrusion and the track when the bridge is in the closed position;
  a thickness of the first and second protrusions is greater than a thickness of an intermediate section of the first portion that extends between the first and second protrusions; and
  the thickness of the first portion that extends between the first and second protrusions enables an inflection point along a length of the first portion that extends between the first and second protrusions when the first portion is transitioned between the closed position of the bridge and an open position of the bridge.

According to a second aspect of the present disclosure, a vehicle includes a track that defines a guide channel and a bridge that extends over the guide channel when the bridge is in a closed position. The bridge includes a first portion pivotably engaged with a first side of the track and having a tab-receiving portion positioned at a free end thereof and a second portion positioned on a second side of the track and including a tab that is received within the tab-receiving portion of the first portion.

Embodiments of the second aspect of the present disclosure can include any one or a combination of the following features:
  the first portion further includes one or more protrusions that extend toward the track when the bridge is in the closed position and resist vertical loads applied to the bridge;
  the one or more protrusions include a first protrusion positioned proximate the first side of the track and a second protrusion positioned proximate the second side of the track;
  the first protrusion engages with an upper surface of the track on the first side when the bridge is in the closed position;
  the second protrusion engages with an upper surface of the second portion when the bridge is in the closed position such that the second portion is positioned between the second protrusion and the track when the bridge is in the closed position;
  a thickness of the first and second protrusions is greater than a thickness of an intermediate section of the first portion that extends between the first and second protrusions; and
  the thickness of the first portion that extends between the first and second protrusions enables an inflection point along a length of the first portion that extends between the first and second protrusions when the first portion is transitioned between the closed position of the bridge and an open position of the bridge.

According to a third aspect of the present disclosure, a vehicle includes a track that defines a guide channel and a bridge that extends over an upper portion of the track to cover the guide channel when in a closed position. The bridge includes a first portion that pivotably engages with a first side of the track. The first portion includes a tab-receiving portion positioned at a free end thereof. The first portion can include a protrusion that extends toward the track when the bridge is in the closed position and resists vertical loads applied to the bridge. The bridge can further include a second portion positioned on a second side of the track that includes a tab that is received within the tab-receiving portion of the first portion.

Embodiments of the third aspect of the present disclosure can include any one or a combination of the following features:
  the first protrusion engages with an upper surface of the track on the first side when the bridge is in the closed position, wherein the protrusion includes a first protrusion positioned proximate the first side of the track and a second protrusion positioned proximate the second side of the track;
  the second protrusion engages with an upper surface of the second portion when the bridge is in the closed position such that the second portion is positioned between the second protrusion and the track when the bridge is in the closed position; and
  a thickness of the first and second protrusions is greater than a thickness of an intermediate section of the first portion that extends between the first and second protrusions, wherein the thickness of the first portion that extends between the first and second protrusions enables an inflection point along a length of the first portion that extends between the first and second protrusions when the first portion is transitioned between the closed position of the bridge and an open position of the bridge.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
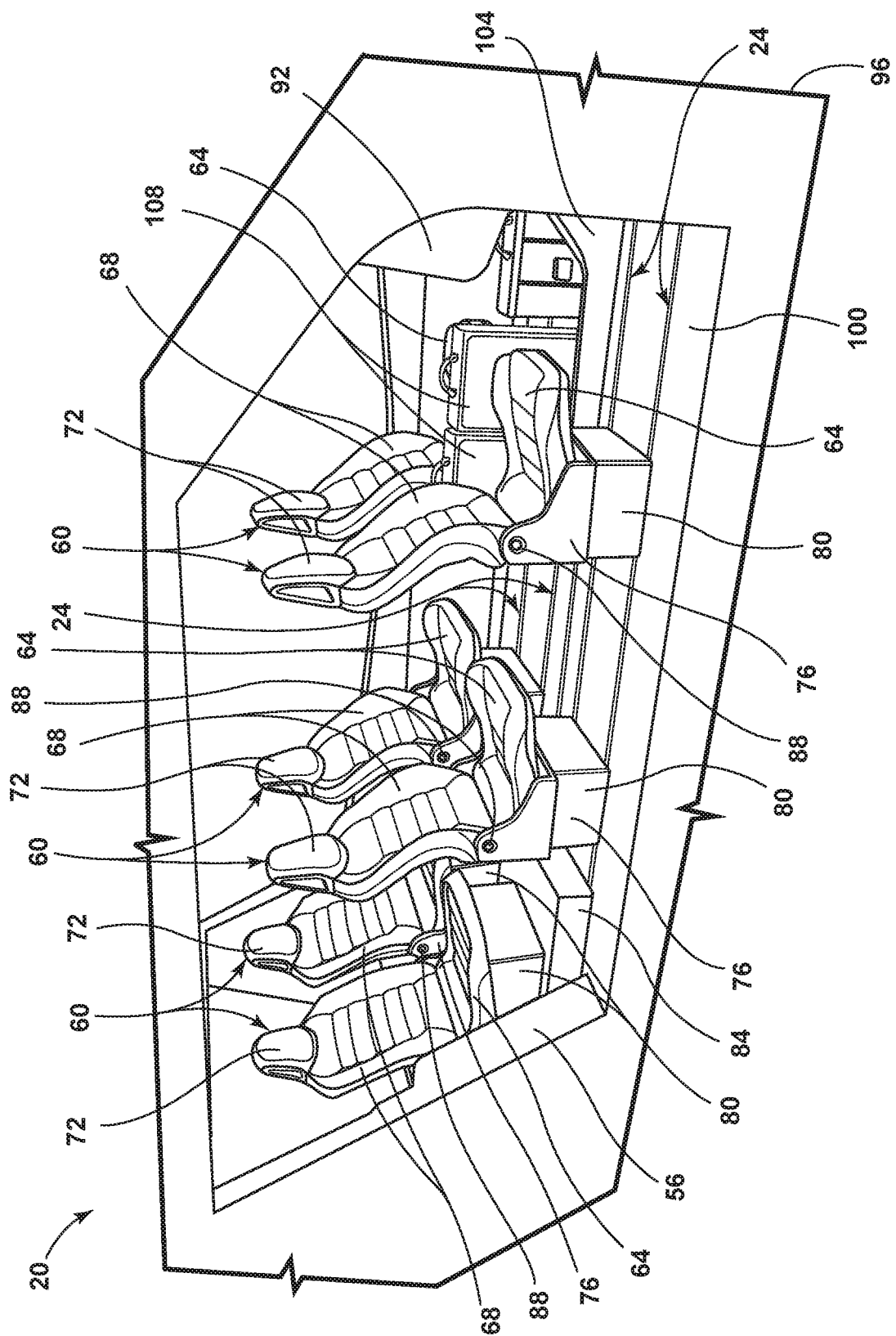
FIG. 1 is a side perspective view of a cabin of a vehicle, illustrating a configuration of seating assemblies, according to one example.
Figure 7:
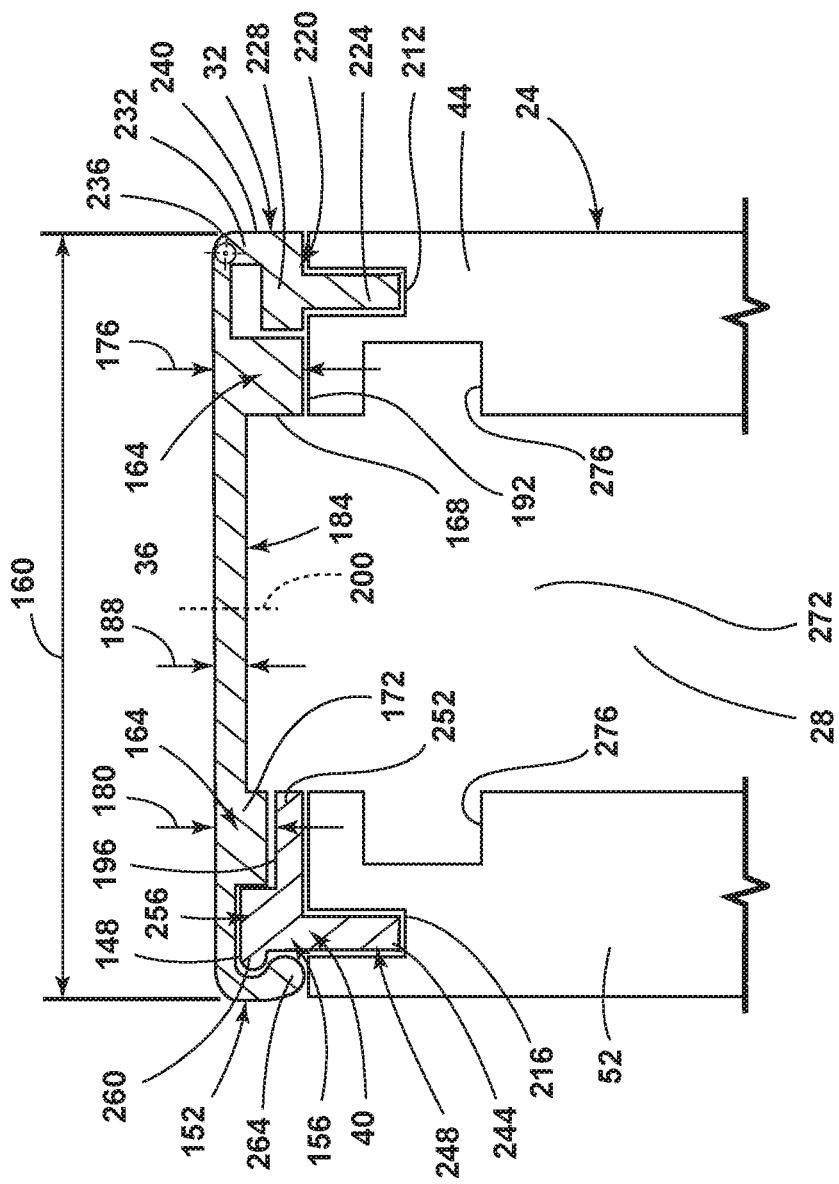
FIG. 7 is a cross-sectional view, taken along line VII-VII of FIG. 6, illustrating a bridge in a closed position.

For purposes of description herein, the terms "upper," "lower," "right," "left," "rear," "front," "vertical," "horizontal," and derivatives thereof shall relate to the concepts as oriented in FIG. 1 and/or FIG. 7. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle cabin. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does riot, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about" It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-8, reference numeral 20 generally designates a vehicle. The vehicle 20 can include a track 24 that defines a guide channel 28. A bridge 32 can be provided that extends over the guide channel 28 when the bridge 32 is in a closed position (FIG. 7). The bridge 32 includes a first portion 36 that is releasably coupled to a second portion 40. The first portion 36 can be pivotably engaged with a first side 44 of the track 24. In various examples, the second portion 40 of the bridge 32 may be positioned on a second side 52 of the track 24.

Figure 2:
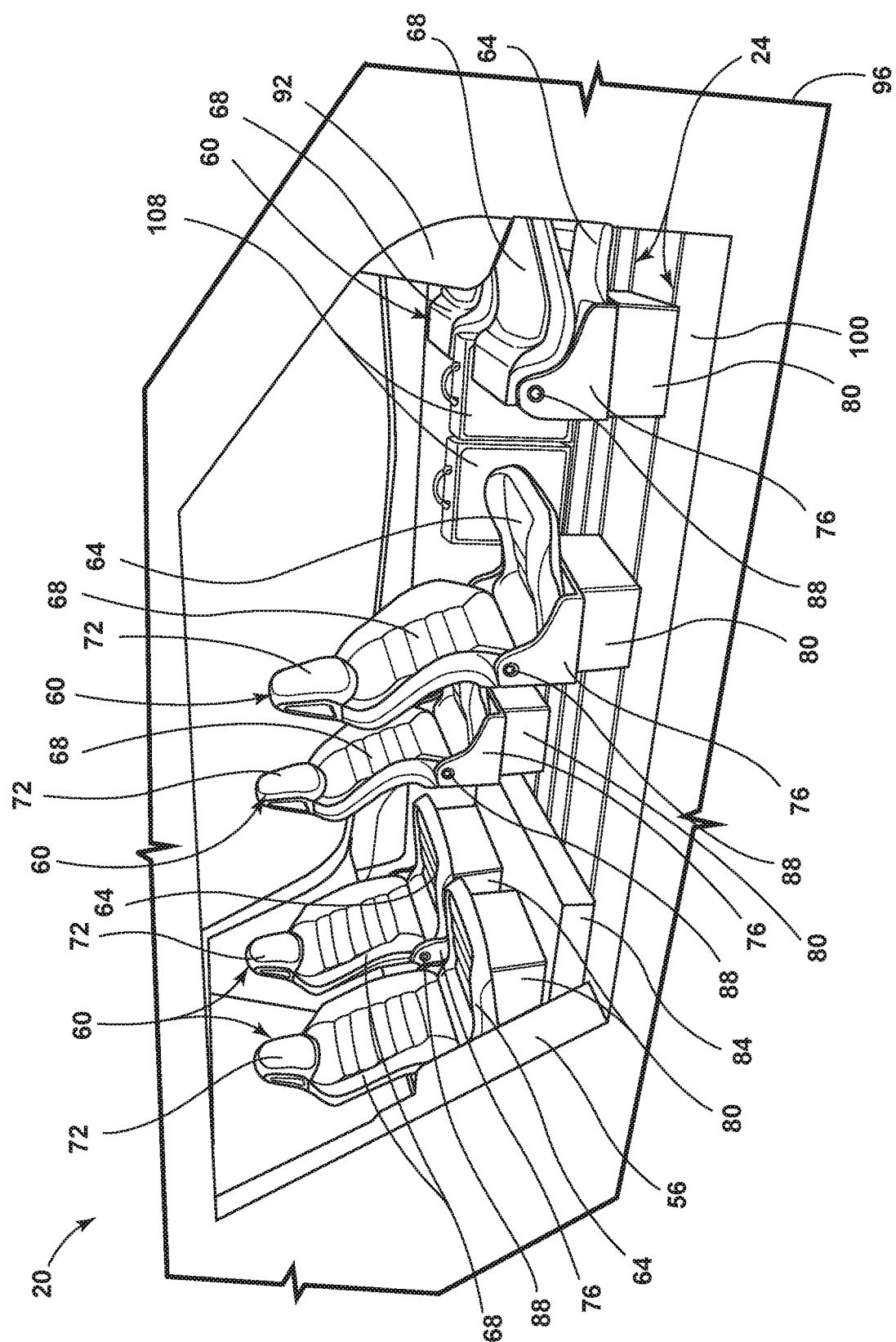
FIG. 2 is a side perspective view of the cabin of the vehicle, illustrating a configuration of the seating assemblies, according to another example.
Figure 3:
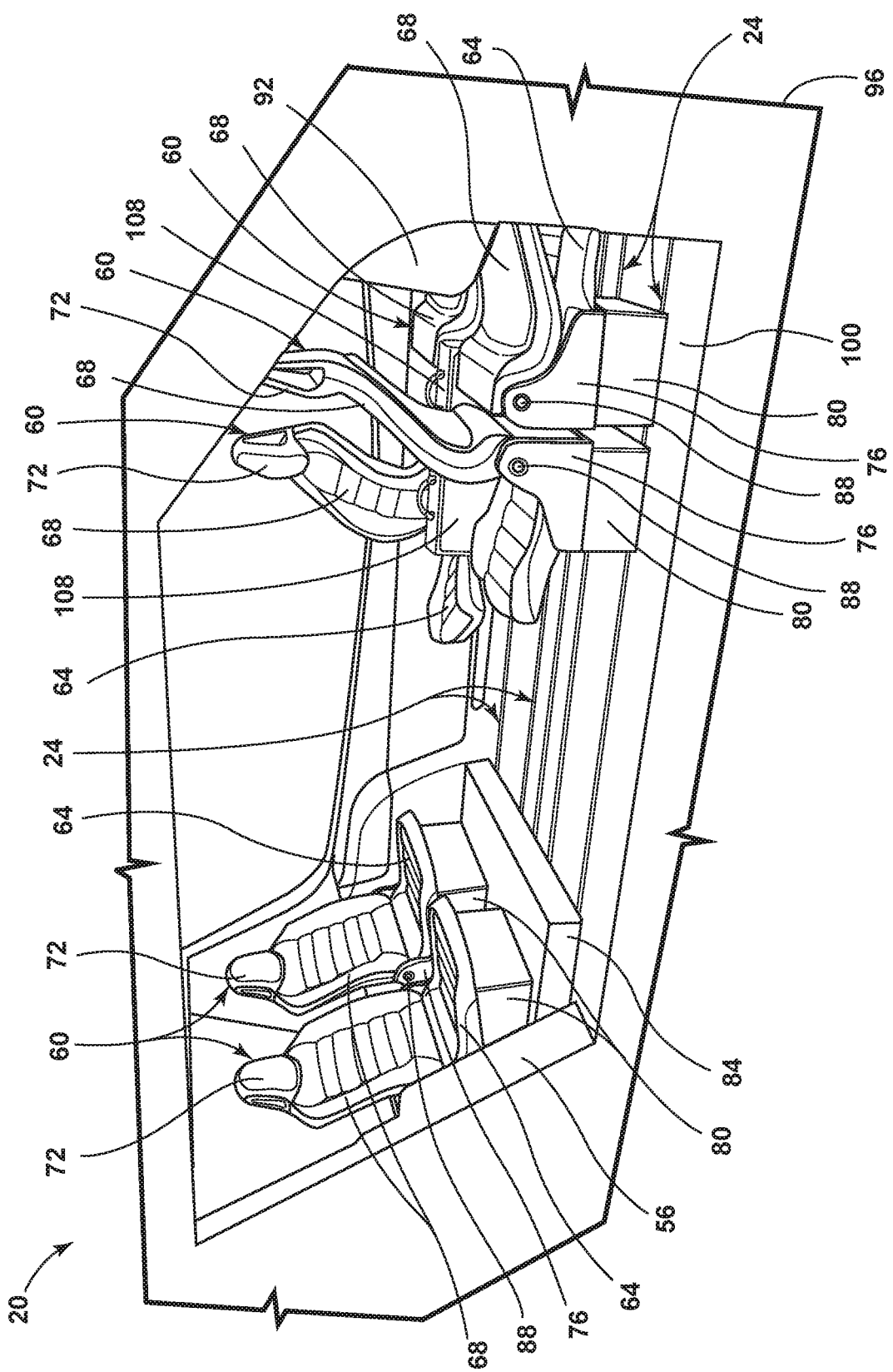
FIG. 3 is a side perspective view of the cabin of the vehicle, illustrating a configuration of the seating assemblies, according to one example.

Referring again to FIGS. 1-3, a cabin 56 of the vehicle 20 can be provided with one or more seating assemblies 60. The seating assemblies 60 can be positioned at various locations along the tracks 24 within the cabin 56. The seating assemblies 60 are provided with a seat 64, a seatback 68, and/or a headrest 72. The seat 64 and the seatback 68 are pivotably coupled to one another by way of a carrier 76. In some examples, the carrier 76 may be directly coupled to the tracks 24 (e.g., by anchors). Alternatively, in various examples, the carrier 76 may be coupled to the tracks 24 indirectly (e.g., by a carriage 80). In some examples, the seating assemblies 60 that are positioned at a rearward most location within the cabin 56 may be provided with an additional platform 84 that is directly coupled to either the carrier 76 or the carriage 80. The platform 84 can provide the rearward most seating assemblies 60 with additional vertical height relative to the remaining seating assemblies 60 to allow occupants of the rearward most seating assemblies 60 a better vantage point and more interesting view than if the seating assemblies 60 were all at about the same height. The platform 84, in some examples, may couple a plurality of the seating assemblies 60 together. For example, the platform 84 may provide a common riser or dais between two adjacent seating assemblies 60. The seating assemblies 60 can he positioned in a conventional first row, second row, and/or third row configuration as shown in FIG. 1. Alternatively, the seating assemblies 60 can be positioned in an unconventional manner, such as the configurations shown in FIGS. 2 and 3. For example, one or more of the seating assemblies 60 may be placed in a stored position, such as those pictured in a forward most row in FIGS. 2 and 3. When in the stored position, the seating assemblies 60 may be stored in a number of positions and/or locations. For example, the seating assemblies 60 may be forward-dumped such that the seatback 68 is generally horizontal and generally parallel with the seat 64 by pivoting the seatback 68 forward about a pivot point 88 of the carrier 76. When in the stored position, the seating assemblies 60 may be stored beneath a forward console 92 that is positioned proximate a front 96 of the vehicle 20. The seating assemblies 60 may be provided with a swivel functionality that allows the seating assemblies 60 to pivot about a vertical axis relative to a floor 100 of the vehicle 20. For example, the carrier 76 may be coupled to the floor 100 by a swivel assembly that permits pivotable motion of the seating assembly 60 about a vertical axis while maintaining engagement of the seating assembly 60 with the tracks 24. In some examples, where the carriage 80 is employed, the carrier 76 and the carriage 80 may be coupled to one another in a manner that permits the pivotable motion of the seating assembly 60 about the vertical axis while maintaining the engagement of the seating assembly 60 with the tracks 24. For example, the carriage 80 may remain coupled to the track(s) 24 and rotationally stationary relative to the track(s) 24 while the carrier 76 and the seating assembly 60 pivot or rotate about the vertical axis relative to the track(s) 24. In examples where the platform 84 is employed, the platform 84 may remain coupled to the track(s) 24 and rotationally stationary relative to the track(s) 24 while the seating assembly 60, the carrier 76, and/or the carriage 80 are capable of pivoting or rotating about the vertical axis relative to the track(s) 24. In various examples, a central console 104 may be provided in a location between at least some of the seating assemblies 60 that are laterally adjacent to one another. The central console 104 may generally extend along a longitudinal axis, or travel axis, of the vehicle 20. The central console 104 can be provided with a number of functionalities, such as storing of luggage 108, providing electrical connections for electrical devices, providing data connections for interaction with the vehicle 20, and/or other convenience and comfort functionalities. The configurations illustrated in FIGS. 1-3 may be referred to as passenger arrangements where the vehicle is primarily being used to transport passengers and their accompanying cargo items. The configurations illustrated in FIGS. 1-3 are exemplary in nature and are not intended to limit the scope of the present disclosure.

Figure 4:
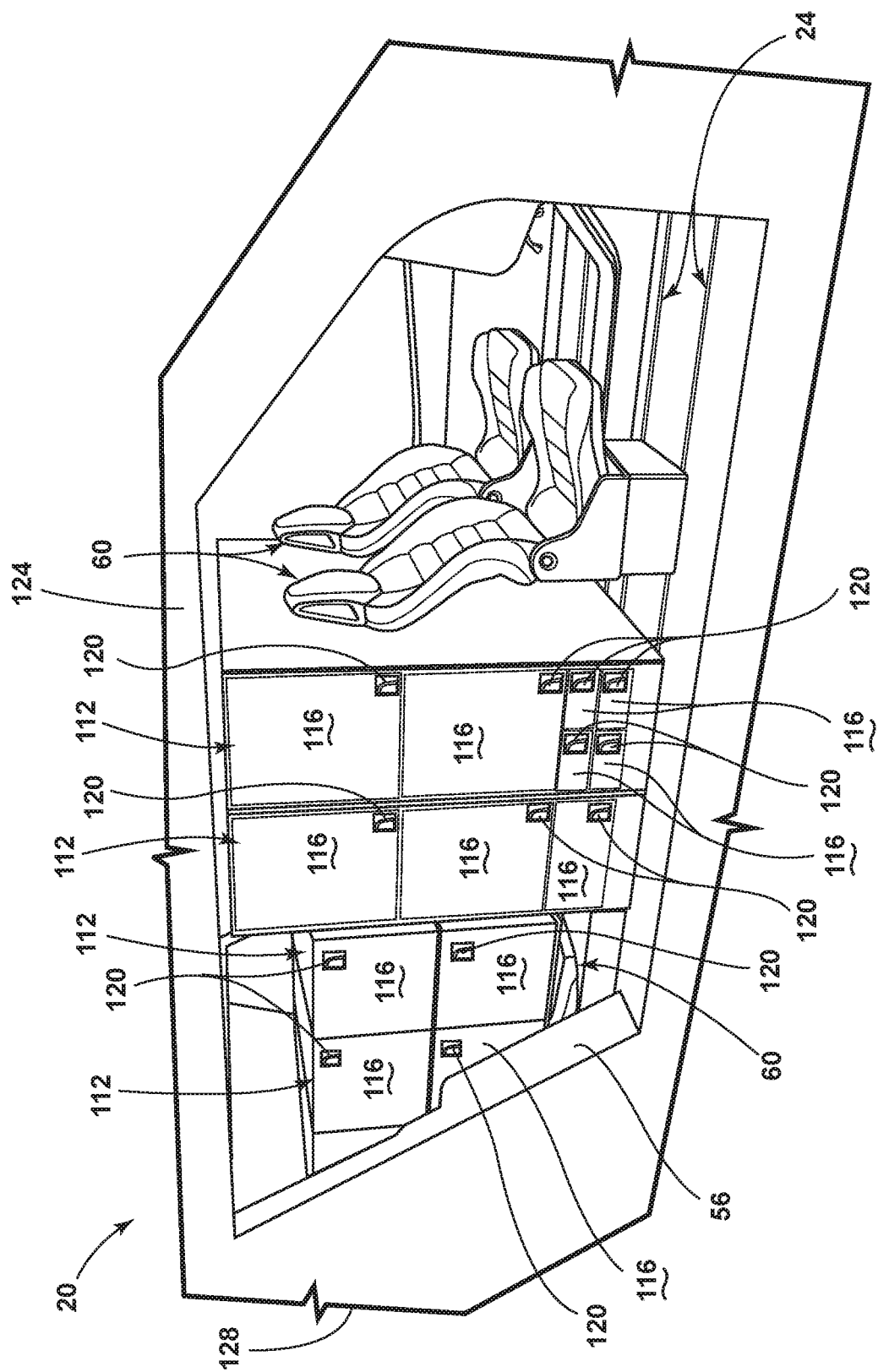
FIG. 4 is a side perspective view of the cabin of the vehicle, illustrating a configuration of the seating assemblies and storage units, according to one example.
Figure 5:
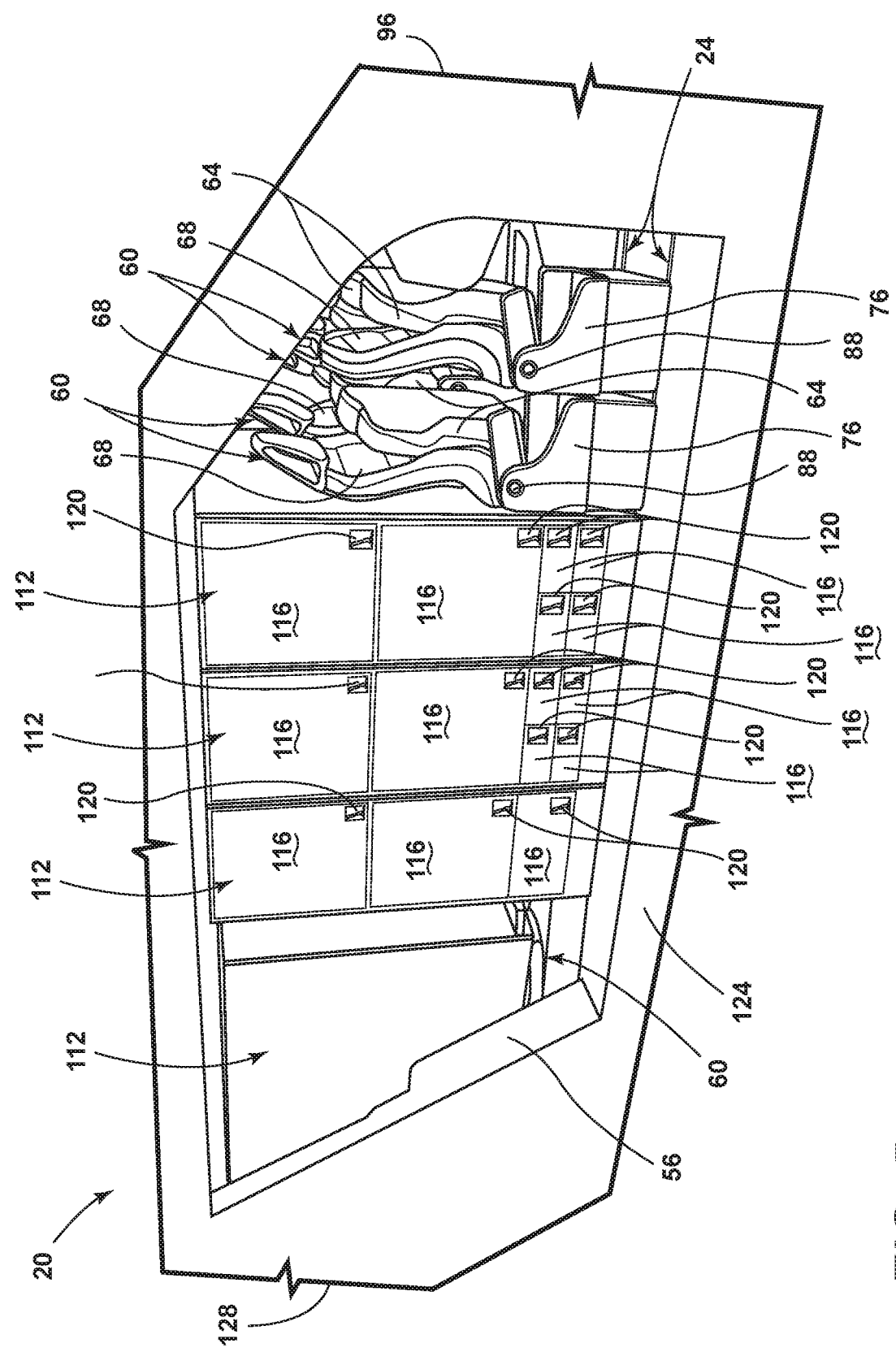
FIG. 5 is a side perspective view of the cabin of the vehicle, illustrating a configuration of the seating assemblies and the storage units, according to another example.
Figure 6:
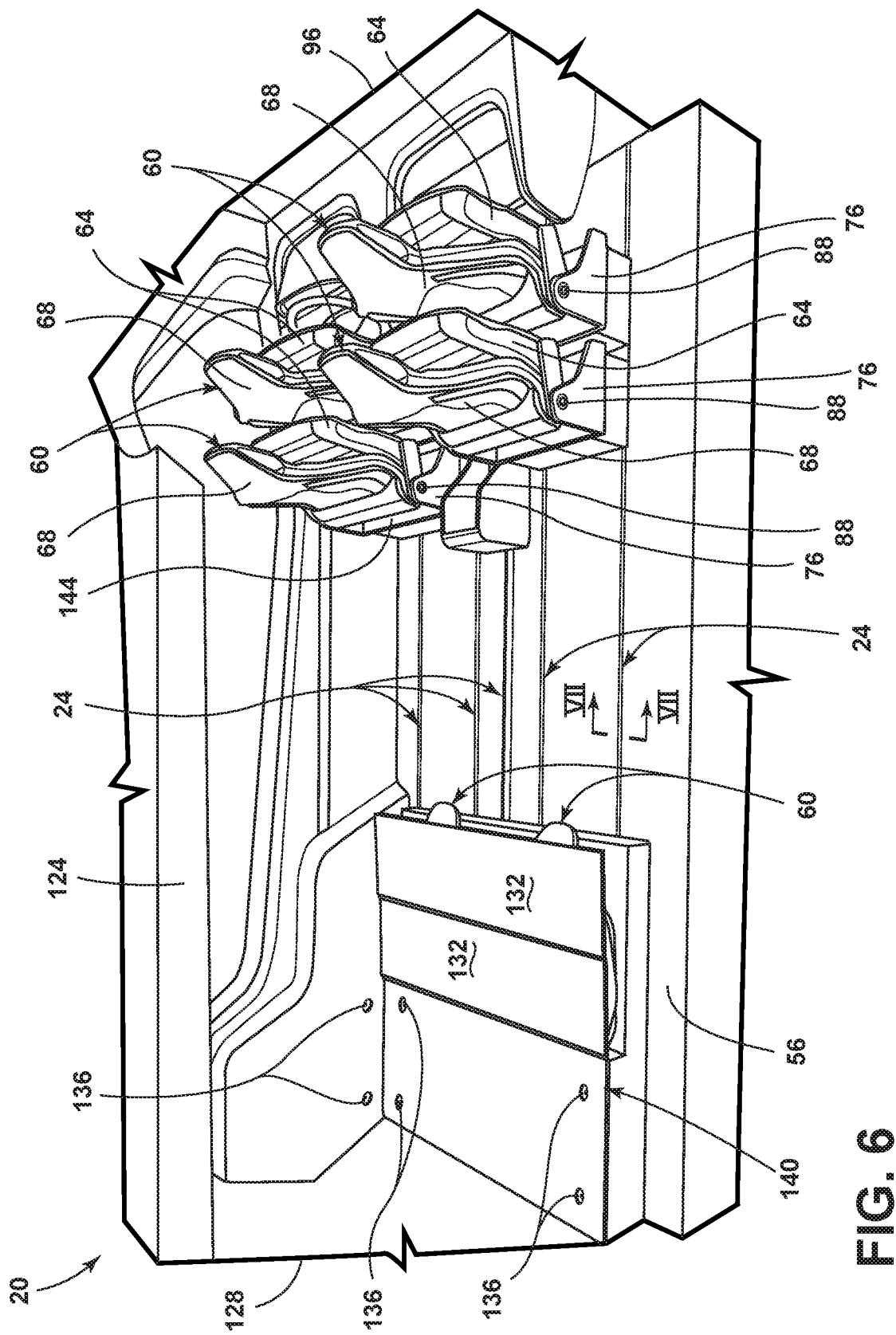
FIG. 6 is a side perspective view of the cabin of the vehicle, illustrating a configuration of the seating assemblies, according to one example.

Referring to FIGS. 4-6, a number of exemplary configurations are illustrated where the vehicle 20 is primarily utilized for cargo transport. In some cargo transport examples, such as that shown in FIG. 4, one or more of the seating assemblies 60 may remain available for occupants that are traveling with the cargo items (e.g., vehicle operators, vehicle monitors, security personnel, etc.). The features and functionalities described above for the cabin 56 of the vehicle 20, the seating assemblies 60, the carriers 76, the carriages 80, and the platform 84 can be provided in whole or in part with the examples depicted in FIGS. 4-6 without departing from the concepts disclosed herein, however, for the sake of brevity the features and functionalities will not be repeated. In some cargo transport configurations, such as that depicted in FIG. 4, unused seating assemblies 60 may be removed from the cabin 56 of the vehicle 20 to make room for cargo items to be stored within the cabin 56 while maintaining one or more of the seating assemblies 60 as available for occupants. The cargo items may be stored in storage units 112 that are placed within the cabin 56. The storage units 112 may engage with the tracks 24 such that the storage units 112 are prevented from unintentional motion during maneuvering of the vehicle 20. The storage units 112 may also receive power from the tracks 24 and/or communicate data between the storage units 112 and the vehicle 20 by way of one or more transceivers. The power and/or data communication provided to the storage units 112 may be used for temperature control of one or more storage compartments 116 within the storage units 112, for lighting the storage compartments 116, for locking/unlocking the storage compartments 116, for actuating a door of the storage compartments 116, for actuating the storage units 112 along the tracks 24, and/or for monitoring contents of the storage compartments 116 (e.g., sensors, imagers, etc.). The storage compartments 116 may be provided with latch assemblies 120 that can be actuated manually or automatically to provide access to an interior of the storage compartments 116. The storage compartments 116 can be accessed from a side 124 or a rear 128 of the vehicle 20. Storage units 112 that are accessible from the rear 128 of the vehicle 20 may be positioned on a rear surface 132 of rearward most seating assemblies 60 when the rearward most seating assemblies 60 are placed in a stowed or fold-flat position (see FIG. 6). When storage units 112 are placed on the rear surfaces 132 of the rearward most seating assemblies 60, these storage units 112 may not be secured to the vehicle 20 by way of the tracks 24. Alternatively, the storage units 112 that are placed on the rear surfaces 132 of the rearward most seating assemblies 60 may be secured to the vehicle 20 by interaction with various components of the cabin 56 of the vehicle 20. For example, the storage units 112 that are placed on the rear surfaces 132 of the rearward most seating assemblies 60 may be secured to the vehicle 20 by interacting with the storage units 112 that are secured to the tracks 24, by tethering or anchoring to tie downs 136 within a cargo area 140 of the cabin 56, and/or by other suitable approaches.

With specific reference to FIGS. 5 and 6, the seating assemblies 60 may additionally or alternatively be capable of being stored in stacked fashion. The seating assemblies 60 may be pivotably coupled to the carriers 76 in a manner that allows the seatback 68 to be placed in a forward-dumped position over the seat 64 (see FIGS. 2 and 3) and/or the seat 64 may be pivoted upward toward the seatback 68 in a stadium-seating manner such that the seat 64 is generally vertical and generally parallel to the seatback 68. Once in a stowed-and-stacked position depicted in FIGS. 5 and 6, a cargo area of the cabin 56 of the vehicle can be increased while maintaining the ability to quickly transition the vehicle 20 back to a primary passenger transport configuration once cargo items have been delivered or removed. To assume the stowed-and-stacked position the seat 64 of the seating assembly 60 is pivoted upward toward the seatback 68 about the pivot point 88 of the carrier 76. Then, the seating assembly 60 can be actuated to an end (e.g., the front 96 or the rear 128) of the vehicle 20 along the tracks 24 such that the seating assemblies 60 may occupy a substantially smaller footprint or surface area than if the seating assemblies 60 were stored in an alternative manner. In some examples, the seating assemblies 60 may be provided with a storage area 144 between an underside of the seat 64 and the carrier 76. The storage area 144 may be provided as a pass-through or open storage area. The storage area 144 may be utilized by occupants of the seating assemblies 60 to store cargo items. In various examples, including those where the seating assemblies are placed in the stowed-and-stacked position, the storage areas 144 may be aligned in tandem or in-line seating assemblies 60 such that long cargo items (e.g., wood beams) may be stored and supported along their length in a manner that also retains the long cargo items within a limited lateral region and prevent the long cargo items from affecting passengers or other cargo items during maneuvers of the vehicle 20.

Figure 8:
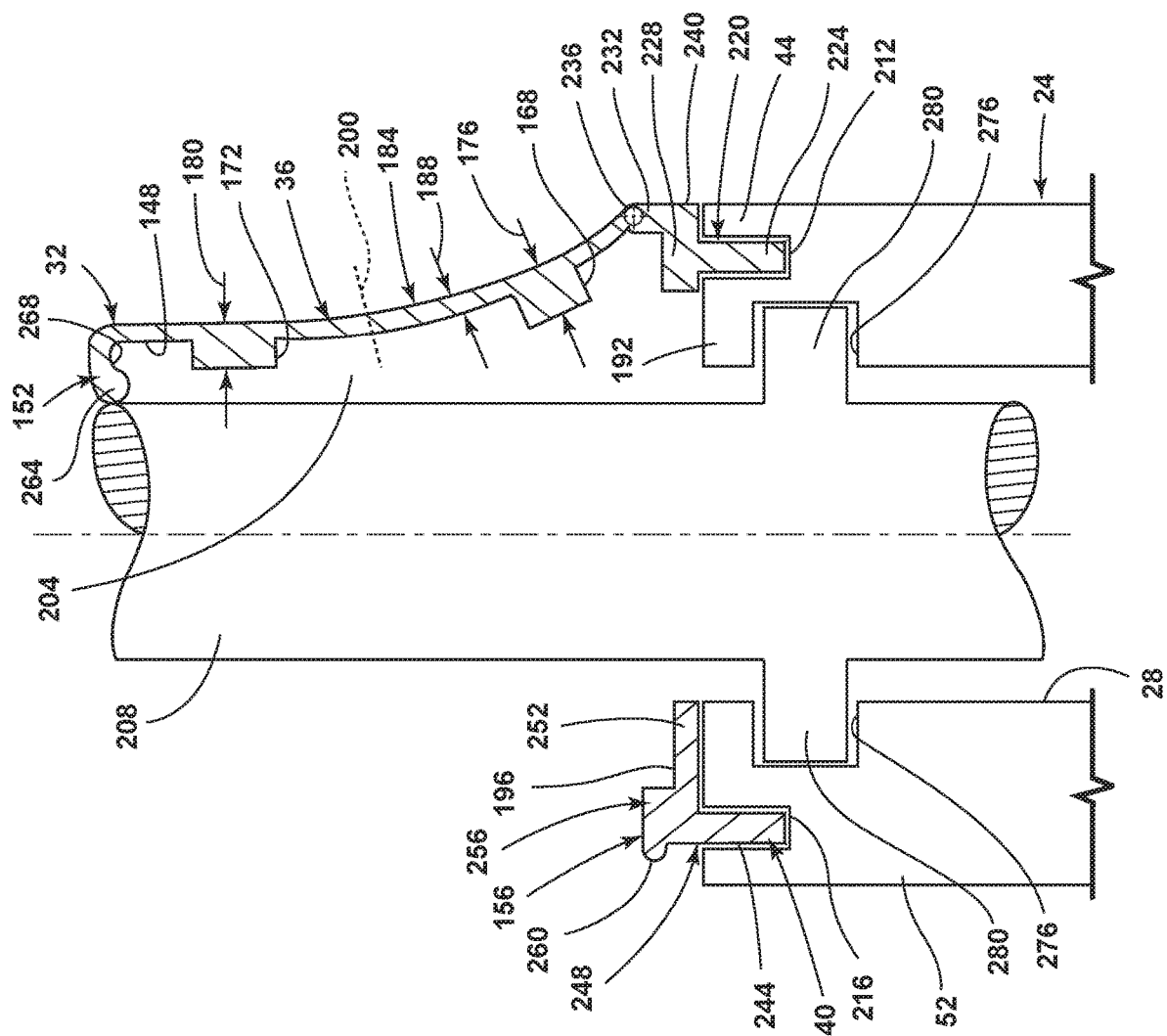
FIG. 8 is a cross-section view, taken along line VII-VII of FIG. 6, illustrating the bridge in the open position.

Referring now to FIGS. 7 and 8, the guide channel 28 defined by the track 24 is shown with the bridge 32 extending over the guide channel 28 while the bridge 32 is in the closed position. The bridge 32 can include the first portion 36 that releasably couples to the second portion 40. In various examples, the first portion 36 may pivotably engage with the first side 44 of the track 24. The first portion 36 of the bridge 32 can include a tab-receiving portion 148 positioned at a free end 152 of the first portion 36. The second portion 40 of the bridge 32 can be positioned on the second side 52 of the track 24. The second portion 40 may define a tab 156 that is received within the tab-receiving portion 148 of the first portion 36. The first portion 36 of the bridge 32 can be provided with a variable thickness along a length 160 of the first portion 36. For example, the first portion 36 can include one or more protrusions 164 that extend toward the track 24 when the bridge 32 is in the closed position. The protrusions 164 can aid the first portion 36 in resisting loads applied to a top of the bridge 32 when the bridge 32 is in the closed position. For example, the loads applied to the top of the bridge 32 may be vertical loads or generally vertical loads. The vertical loads may result from, for example, a user stepping on the bridge 32, a user stepping on the bridge 32 with narrow-heeled shoes, a cargo item resting on the bridge 32, and so on. In various examples, the one or more protrusions 164 may include a first protrusion 168 and a second protrusion 172. The first protrusion 168 can be positioned on the first side 44 of the track 24 and the second protrusion 172 can be positioned on the second side 52 of the track 24. The first protrusion 168 may be provided with a first thickness 176. The second protrusion 172 may he provided with a second thickness 180. An intermediate section 184 of the first portion 36 of the bridge 32 that extends between the first and second protrusions 168, 172 may be provided with a third thickness 188. In some examples, the first thickness 176 may be substantially equal to the second thickness 180. Alternatively, the first thickness 176 and the second thickness 180 may differ from one another. For example, the first thickness 176 may be greater than the second thickness 180 or the first thickness 176 may be less than the second thickness 180. The third thickness 188 of the intermediate section 184 may be less than the first thickness 176 and/or the second thickness 180.

Referring again to FIGS. 7 and 8, in the depicted example, the first protrusion 168 engages with an upper surface 192 of the track 24 on the first side 44 when the bridge 32 is in the closed position. The second protrusion 172 may engage with an upper surface 196 of the second protrusion 172 when the bridge 32 is in the closed position. Accordingly, the second protrusion 172 may be positioned between the second protrusion 172 and the track 24 When the bridge 32 is in the closed position. The lesser thickness of the third thickness 188 at the intermediate section 184 between the first and second protrusions 168, 172 may enable an inflection point 200 along the length 160 of the first portion 36. More specifically, the inflection point 200 may be positioned along the length 160 of the first portion 36 at a location that is between the first and second protrusions 168, 172. The region of the intermediate section 184 where the inflection point 200 is located may remain generally flat or generally horizontal when the bridge 32 is in the closed position. As the bridge 32 is actuated from the closed position to the open position and/or from the open position to the closed position, the bridge 32 may at least partially deform at, pivot about, or otherwise induce the inflection point 200. The inflection point 200 can enable the bridge 32 to be positioned nearer to the anchor 208 when the bridge 32 is in the open position such that a gap 204 between the bridge 32 and an anchor 208 that engages with the guide channel 28 is decreased or narrowed. The gap 204 can be defined by the anchor 208, an underside of the bridge 32, and the upper surface 192 of the track 24. The decrease or narrowing of the gap 204 as a result of the provided and/or designed inflection point 200 decreases the likelihood for debris or foreign objects to enter the gap 204 and ultimately impact the operation of the anchor 208 along the track 24. The impact to the operation of the anchor 208 along the track 24 may occur due to debris or foreign objects becoming wedged or otherwise stuck between the anchor 208 and the bridge 32, debris or foreign objects may ultimately enter the guide channel 28 and impact the smooth operation of the anchor 208 along the track 24, and so on. Additionally, the decrease or narrowing of the gap 204 can be beneficial in that a lesser area of the bridge 32, which may run a length of the track 24, is locally deformed by the actuation of the bridge 32 to the open position by the anchor 208. Said another way, in examples where the bridge 32 is a generally continuous construction along the length of the track 24, the anchor 208 may not actuate the bridge 32 to the open position in only the location that the anchor 208 is located. The bridge 32 may be provided with a degree of rigidity that results in the bridge 32 being placed in the open position at locations that are near the anchor 208 but not immediately adjacent to the anchor 208. By decreasing or narrowing the gap 204 and providing the inflection point 200, a lesser area of the bridge 32 may be raised to the open position or a partially-opened position at a time. Said another way, by decreasing or narrowing the gap 204 and providing the inflection point 200, the distance along the bridge 32 away from the anchor 208 where the bridge 32 is not immediately adjacent to the anchor 208 but is nonetheless adjusted in its position as a result of the anchors 208 proximity may be decreased. Said in yet another way, the local deformation of the bridge 32 by the anchor 208 may remain more local (i.e., closer to the anchor 208) and less remote from the anchor 208. Accordingly, a region of influence of the anchor 208 on the bridge 32 may be decreased. By decreasing the local deformation of the bridge 32, a probability for catching or binding of the bridge 32 with components of the seating assembly 60 and/or the storage units 112 is decreased. For example, the chances of the bridge 32 becoming pinned beneath an underside of the component attached to the anchor 208 (e.g., the seating assembly 60 or the storage units 112) and affecting the actuation of the component along the track 24 may be decreased.

Referring further to FIGS. 7 and 8, a first slot 212 may extend along the first side 44 of the track 24. The first slot 212 may be generally parallel to the guide channel 28. In the depicted example, the first slot 212 extends to a depth within the track 24 that is less than a depth of the guide channel 28. Similarly, a second slot 216 may extend along the second side 52 of the track 24. The second slot 216 may be generally parallel to the guide channel 28. In the depicted example, the second slot 216 extends to a depth within the track that is less than the depth of the guide channel 28. In some examples, the depth of the first slot 212 and the depth of the second slot 216 may be substantially similar or substantially equal. The first portion 36 of the bridge 32 can include a first-slot engagement feature 220 that is received into the first slot 212. The first-slot engagement feature 220 can include a first leg 224 that extends into the first slot 212 in the track 24, a first cross-member 228 that extends at an angle from the first leg 224 and engages with the upper surface 192 of the track 24, and a second leg 232 that extends from the first cross-member 228 toward a pivot point 236 of the first portion 36. The pivot point 236 may generally correspond with a transition from a generally horizontal section of the first portion 36 to a generally vertical section of the first portion 36 at a coupled end 240 of the first portion 36 in the depicted example. The first leg 224, the first cross-member 228, and the second leg 232 cooperate during the opening and closing of the bridge 32 to retain the first portion 32 within the first slot 212 and coupled to the track 24 at the first side 44 of the track 24. The second portion 40 of the bridge 32 can include a third leg 244 that acts as a second-slot engagement feature 248 and is received into the second slot 216. The third leg 244 can extend into the second slot 216. A fourth leg 252 can extend at an angle from the third leg 244 and engage with the upper surface 192 of the track 24 on the second side 52. The second protrusion 172 may rest upon the upper surface 196 of the fourth leg 252. The thickness of the second protrusion 172 and a thickness of the fourth leg 252 may be similar to or substantially equal to the first thickness 176 of the first protrusion 168. An elevated portion 256 of the second portion 40 may extend vertically above the upper surface 196 of the second side 52 and be engaged by the tab-receiving portion 148 of the first portion 36. A retention feature 260 may extend from the elevated portion 256 that retains the tab-receiving portion 148 of the first portion 36 to the second portion 40 when the bridge 32 is in the closed position. For example, the retention feature 260 may extend radially outward from the elevated portion 256 beyond an exterior wall or exterior surface of the third leg 244. The retention of the first portion 36 to the second portion 40 when the bridge 32 is in the closed position may be at least partially facilitated by an interaction between the retention feature 260 and an arcuate portion 264 of the first portion 36. For example, a recess 268 in the arcuate portion 264 may receive the retention feature 260 such that an underside of the retention feature 260 is engaged by an interior surface of the recess 268 and the first portion 36 is vertically retained to the second portion 40 by an interference fit. The inter-ference fit may be overcome by the application of a sufficient vertical actuation force that results in local deformation of the arcuate portion 264 and/or the elevated portion 256. Additionally or alternatively, the interference fit may be overcome by the application of a sufficient vertical actuation force that results in the inducement of the inflection point 200.

Referring still further to FIGS. 7 and 8, the anchor 208 is received in a central region 272 of the guide channel 28. In some examples, the track 24 may define lateral receptacles 276 that are laterally offset from the central region 272 of the guide channel 28 while remaining a generally continuous area defined by the track 24. The lateral receptacles 276 may receive wings 280 that extend radially outward from the anchor 208. The wings 280 may aid in load distribution, anchor 208 retention within the guide channel 28, guidance of the anchor 208 along the track 24, and so on.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to he covered by the following claims, unless these claims, by their language, expressly state otherwise.

What is claimed is:

1. A vehicle, comprising:
a track defining a guide channel; and
a bridge that extends over the guide channel when in a closed position, the bridge comprising:
a first portion releasably coupled to a second portion, the first portion pivotably engaged with a first side of the track.

2. The vehicle of claim 1, wherein the first portion comprises a tab-receiving portion positioned at a free end of the first portion.

3. The vehicle of claim 2, wherein the second portion is positioned on a second side of the track and has a tab that is received within the tab-receiving portion of the first portion.

4. The vehicle of claim 3, wherein the first portion further comprises one or more protrusions that extend toward the track when the bridge is in the dosed position and resist loads applied to a top of the bridge.

5. The vehicle of claim 4, wherein the one or more protrusions comprises a first protrusion positioned proximate the first side of the track and a second protrusion positioned proximate the second side of the track.

6. The vehicle of claim 5, wherein the first protrusion engages with an upper surface of the track on the first side when the bridge is in the closed position.

7. The vehicle of claim 5, wherein the second protrusion engages with an upper surface of the second portion when the bridge is in the closed position such that the second portion is positioned between the second protrusion and the track when the bridge is in the closed position.

8. The vehicle of claim 5, wherein a thickness of the first and second protrusions is greater than a thickness of an intermediate section of the first portion that extends between the first and second protrusions.

9. The vehicle of claim 8, wherein the thickness of the first portion that extends between the first and second protrusions enables an inflection point along a length of the first portion that extends between the first and second protrusions when the first portion is transitioned between the closed position of the bridge and an open position of the bridge.

10. A vehicle, comprising:
a track defining a guide channel; and
a bridge extending over the guide channel when in a closed position, the bridge comprising:
a first portion pivotably engaged with a first side of the track and having a tab-receiving portion positioned at a free end thereof; and
a second portion positioned on a second side of the track and having a tab that is received within the tab-receiving portion of the first portion.

11. The vehicle of claim 10, wherein the first portion further comprises one or more protrusions that extend toward the track when the bridge is in the closed position and resist vertical loads applied to the bridge.

12. The vehicle of claim 11, wherein the one or more protrusions comprises a first protrusion positioned proximate the first side of the track and a second protrusion positioned proximate the second side of the track.

13. The vehicle of claim 12, wherein the first protrusion engages with an upper surface of the track on the first side when the bridge is in the closed position.

14. The vehicle of claim 12, wherein the second protrusion engages with an upper surface of the second portion when the bridge is in the closed position such that the second portion is positioned between the second protrusion and the track when the bridge is in the closed position.

15. The vehicle of claim 12, wherein a thickness of the first and second protrusions is greater than a thickness of an intermediate section of the first portion that extends between the first and second protrusions.

16. The vehicle of claim 15, wherein the thickness of the first portion that extends between the first and second protrusions enables an inflection point along a length of the first portion that extends between the first and second protrusions when the first portion is transitioned between the closed position of the bridge and an open position of the bridge.

17. A vehicle, comprising:
a track defining a guide channel; and
a bridge that extends over an upper portion of the track to cover the guide channel when in a closed position, the bridge comprising:
a first portion pivotably engaged with a first side of the track, the first portion having a tab-receiving portion positioned at a free end thereof, the first portion having a protrusion that extends toward the track when the bridge is in the closed position and resists vertical loads applied to the bridge; and
a second portion positioned on a second side of the track and having a tab that is received within the tab-receiving portion of the first portion.

18. The vehicle of claim 17, wherein the first protrusion engages with an upper surface of the track on the first side when the bridge is in the closed position, and wherein the protrusion comprises a first protrusion positioned proximate the first side of the track and a second protrusion positioned proximate the second side of the track.

19. The vehicle of claim 18, wherein the second protrusion engages with an upper surface of the second portion when the bridge is in the closed position such that the second portion is positioned between the second protrusion and the track when the bridge is in the closed position.

20. The vehicle of claim 18, wherein a thickness of the first and second protrusions is greater than a thickness of an intermediate section of the first portion that extends between the first and second protrusions, and wherein the thickness of the first portion that extends between the first and second protrusions enables an inflection point along a length of the first portion that extends between the first and second protrusions when the first portion is transitioned between the closed position of the bridge and an open position of the bridge.

* * * * *

UNITED STATES PATENT AND TRADEMARK OFFICE
CERTIFICATE OF CORRECTION

PATENT NO. : 10,821,856 B2
APPLICATION NO. : 16/218681
DATED : November 3, 2020
INVENTOR(S) : Dry et al.

Page 1 of 1

It is certified that error appears in the above-identified patent and that said Letters Patent is hereby corrected as shown below:

In the Claims

Column 11; Claim 4, Line 35:
"dosed" should be --closed--.

Signed and Sealed this
Twenty-ninth Day of December, 2020

Andrei Iancu
*Director of the United States Patent and Trademark Office*